Oct. 21, 1969　　　　　J. R. HARRIS　　　　　3,474,350
AMPLIFICATION BY PERIODICALLY QUENCHING AN UNSTABLE SYSTEM
Filed Nov. 28, 1966　　　　　　　　　　　　　　3 Sheets-Sheet 1
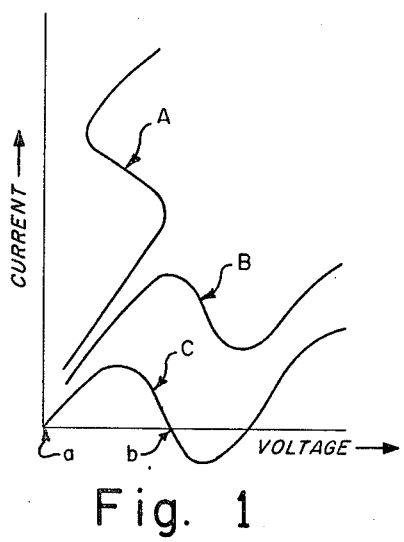
Fig. 1
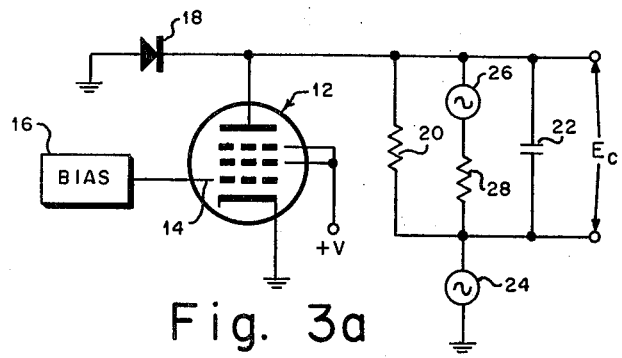
Fig. 3a
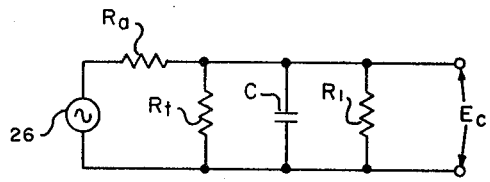
Fig. 3b
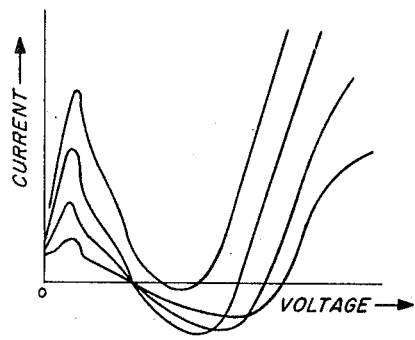
Fig. 2
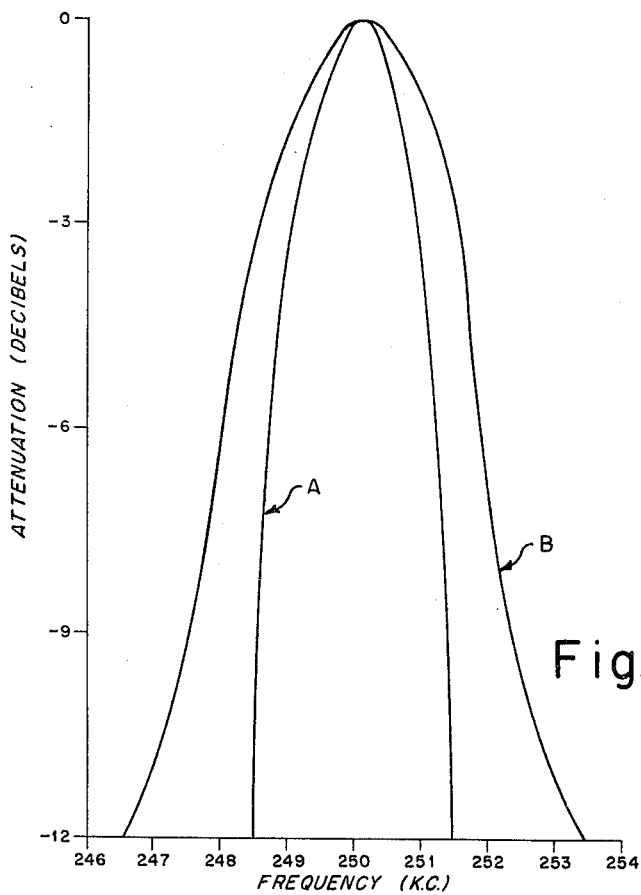
Fig. 9
INVENTOR.
JACK R. HARRIS
BY
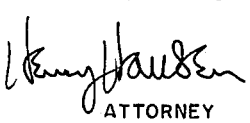
ATTORNEY Oct. 21, 1969  J. R. HARRIS  3,474,350
AMPLIFICATION BY PERIODICALLY QUENCHING AN UNSTABLE SYSTEM
Filed Nov. 28, 1966  3 Sheets-Sheet 2
Fig. 4a
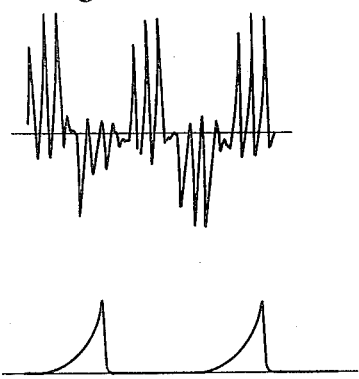
Fig. 4b
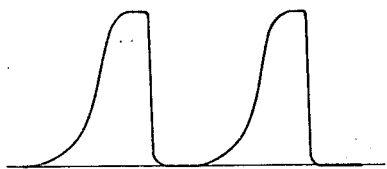
Fig. 4c
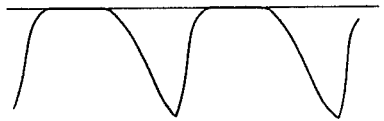
Fig. 4d
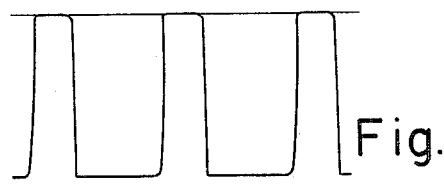
Fig. 7a
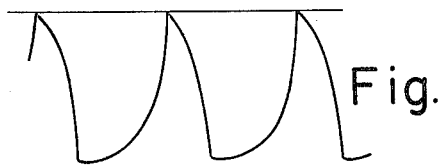
Fig. 6a
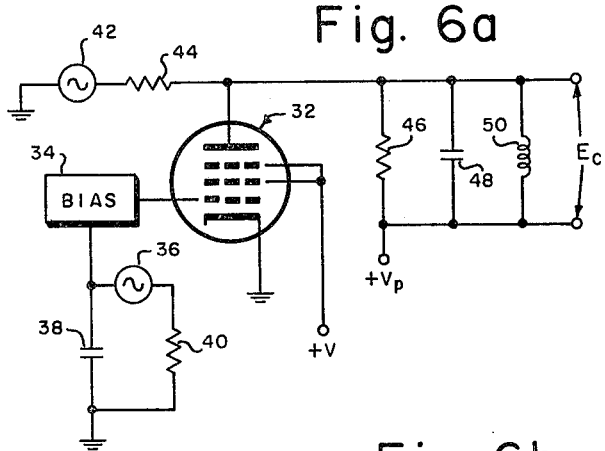
Fig. 6b
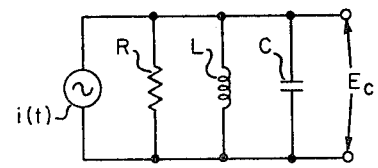
Fig. 8a
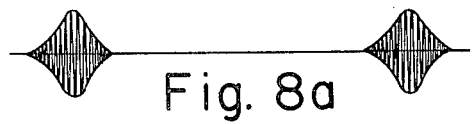
Fig. 8b
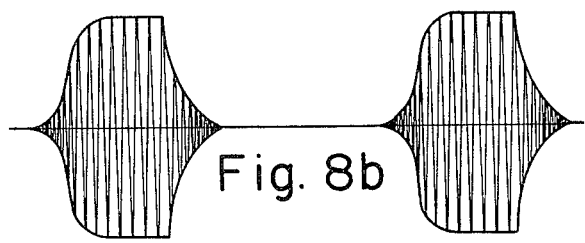
Fig. 7b
INVENTOR.
JACK R. HARRIS
BY
ATTORNEY

INVENTOR.
JACK R. HARRIS

United States Patent Office 3,474,350
Patented Oct. 21, 1969

3,474,350
AMPLIFICATION BY PERIODICALLY QUENCHING AN UNSTABLE SYSTEM
Jack R. Harris, 33 Bruce Drive, Holland, Pa. 18966
Filed Nov. 28, 1966, Ser. No. 597,496
Int. Cl. H03f 1/00
U.S. Cl. 330—203    11 Claims

ABSTRACT OF THE DISCLOSURE

A system for amplifying electrical signals utilizing electrically unstable devices which are periodically switched between the stable and unstable states is described. During the unstable state the system impedance is varied by a time-varying parameter for obtaining more desirable frequency response characteristics.

---

The invention described herein may be manufactured and used by or for the Government of the United States of America for governmental purposes without the payment of any royalties thereon or therefor.

The present invention relates generally to improvements in oscillatory systems and the like and more particularly to new and improved modes of operation of unstable electrical systems used as amplifiers.

The use of superregenerative amplifiers has long been recognized as a simple technique for providing large amounts of radio frequency amplification with minimum circuitry. Such a technique was early recognized by Edwin E. H. Armstrong and published in proceeding of the IRE, volume 10, August 1922. Although this technique of amplification afforded a simple means of obtaining a high degree of receiver sensitivity at very high radio frequencies, except for the early days of radio and its subsequent use during World War II, it has not enjoyed a great deal of popularity. The principal reasons for the decline of the super-regenerative system can be attributed to the poor selectivity, the characteristic audio hiss in the absence of an input signal, and the introduction of distortion in the modulation envelope. Additionally, with the introduction of superheterodyne receivers, the desirable gain characteristics of the superregenerative receiver were far-outweighed by the superheterodyne characteristics.

In the field of electrical signal amplifiers, various techniques have been employed to attain both high gain characteristics and desirable phase and/or frequency characteristics. Although conventional tube and transistor amplifiers, parametric, superregenerative and superheterodyne amplifiers have served this purpose in certain applications, the need for high gain amplifiers with desirable phase and frequency characteristics still exists.

Accordingly, it is a general purpose of the present invention to provide a general class of amplifying systems which can be represented by an $n$th order differential equation of which the superrengerative amplifier is just a specialized form. To attain this, the invention utilizes an electrically unstable system that is periodically quenched (switched) between the stable and unstable state of operation. Three illustrative circuit embodiments of the invention are described herein in which the first provides for a signal input having a frequency normally considerably less than that of the quenching frequency. The mode of operation of the first embodiment is expressed by a first and third through $n$th order differential equation, where $n$ is an integer. The second circuit embodiment is similar to the first except it is periodically quenched between a stable and unstable state for all orders of systems in which during the unstable mode of operation a system impedance is varied by a time varying parameter so as to obtain a more desirable frequency response characteristic. The third circuit embodiment is similar to the second except that it utilizes a varying impedance component as the input parameter from which an output signal is obtained. These three embodiments provide a class of amplifying systems which not only exhibit high gain characteristics but also more desirable selectivity characteristics than a normal amplifier.

Although specific reference herein is made to the lower order amplifying systems, the operation of higher order systems will be appreciated since they represent merely the addition of more reactive components, feedback amplifiers and the like with their operation linearly unstable in design with quenching operation possible. A more detailed analytical discussion of the modus operandi of each system can be found in a thesis entitled "Studies of Periodically Quenched Regenerative Systems" by the inventor and published on February 28, 1966 by the U.S. Navy Post Graduate School.

An object of the invention is therefore to provide a system which has amplification, phase and frequency characteristics not achievable with prior art devices wherein the only gain limitations are those imposed by the particular device employed and not by limitations on the inventive concept.

Another object of the invention is to provide a periodically quenched unstable system defined by all orders of differential equations wherein the normal selectivity characteristics of prior art amplifying systems can be considerably improved while still maintaining high gain amplification.

Other objects and many of the attendant advantages of this invention will be readily appreciated as the same becomes better understood by reference to the following detailed description when considered in connection with the accompanying drawing wherein:

FIG. 1 illustrates typical voltage vs. current characteristics for various negative resistance devices;

FIG. 2 illustrates typical voltage vs. current characteristics of a negative resistance device for various control inputs;

FIG. 3a is a schematic diagram of one embodiment of the present invention;

FIG. 3b illustrates an electrical equivalent circuit for the embodiment of FIG. 3a;

FIG. 4a through 4d illustrate various wave shapes associated with the embodiment of FIG. 3a;

FIGS. 5a and 5b illustrate characteristics of the embodiment of FIG. 3a;

FIG. 6a is a schematic diagram of a second embodiment of the invention;

FIG. 6b illustrates an electrical equivalent circuit ot the embodiment of FIG. 6a;

FIGS. 7a, 7b, 8a, 8b illustrate various wave shapes associated with the circuit of FIG. 6a;

FIG. 9 illustrates a typical selectivity characteristic of the embodiment of FIG. 6a;

Figure 5A:
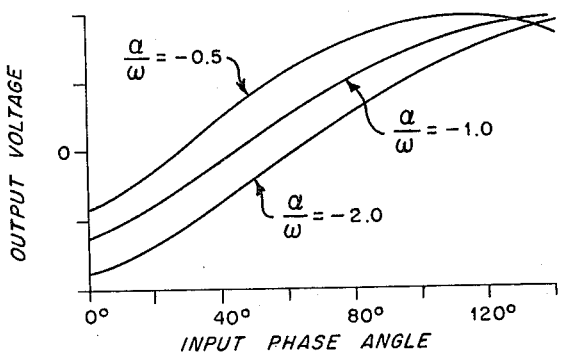

Various devices and circuits have been utilized to achieve a negative resistance or impedance characteristic (a normally required element in an oscillatory system). In general, negative resistance devices are either of the current controlled or voltage controlled variety. The current controlled devices are represented by arc or glow discharge tubes while the voltage controlled devices are represented by the tunnel diode and the dynatron. The voltage-current characteristic for the current controlled device is illustrated in FIG. 1 by curve A and the voltage controlled device characteristics by curves B and C. An inspection of curves A and B immediately reveals that in using either of the devices with these characteristics in an unstable sampling system which has a low frequency or D-C amplification capability, amplification of low level input signals is swamped out by the initial voltage or current that is required for achieving the negative resistance characteristic; that is, a relatively large bias voltage is required before the negative resistance characteristic is exhibited. In addition, in sampling and resetting these devices, a transient response or change in steady state parameters would result which would swamp out the influence of any low level input signal. There is, however, a mode of dynatron operation, as shown in FIG. 1 by curve C, which has the desired negative resistance characteristic without the associated undesirable bias voltage. Although the dynatron is illustrated herein, it is to be understood that other devices exhibiting such characteristics could equally well be employed without departing from the spirit and scope of the present invention.

If a device is made to switch between points $a$ and $b$ periodically, as illustrated in FIG. 1, then the device would be portraying an external circuit having first a positive then a negative resistance without externally influencing the system, i.e., for both positive and negative resistances, there is no current through the device.

The dynatron characteristic is not new with pentode tubes. In fact, it has presented a serious problem in the development of the pentode since care had to be taken in order to assure that the plate voltage did not go below that of the screen voltage, otherwise a curious "knee" occurred in the plate current causing distortion and possible unstable operation. This is one of the main reasons the pentode was developed; the suppressor grid was biased so as to force the plate rejected electrons to be re-attracted by the plate. Because of this, only certain pentodes, those with separate suppressor leads, could provide the desired negative resistance characteristics.

FIG. 2 illustrates typical plate current vs. voltage characteristics of a 6SK7 type vacuum tube in which the control grid bias voltage is varied between +2.5 to −5 volts and the suppressor and screen grids are held at a constant potential of 100 volts. Then by varying the plate voltage between 0 and 200 volts with a series load resistor, the characteristic curves illustrated in FIG. 2 are obtained. As can be seen from these curves, when the plate voltage is lower than that of the screen voltage, a negative resistance characteristic is obtained; however, in some instances a finite plate current flows and this would swamp out any small signal input in the embodiment to be described with reference to FIG. 3a. Accordingly, the most desirable type characteristic for this embodiment is that of switching between two plate voltages, neither of which require plate current but both providing a static and dynamic switchable positive and negative resistance characteristic. It should be pointed out, however, that while this special mode of dynatron operation is particularly helpful in illustrating the first embodiment of the invention defined by a first order differential equation, it is not necessary for any of the other embodiments.

Mathematically, a first order system can be defined by the following differential equation:

$$e(t) = a(t)q + b(t)\frac{dq}{dt} \qquad (1)$$

where $e(t)$ is a step function, being zero before time $(t)$ equals zero, and E afterwards and where $a(t)$ and $b(t)$ are constant after $t=0$. A particular solution to this equation can be had that lends itself to a physical interpretation by associating the term $q(t)$ with electrical charge, E with voltage, $a(t)$ with inverse capacitance farads −1 ($c^{-1}$) and $b(t)$ with electrical resistance in ohms (R); a series battery, resistor and capicitor combination then become the physical reality.

Referring now to FIG. 3a, there is shown embodiment of the invention for a first order system as defined by the first order differential equation. The embodiment utilizes a pentode vacuum tube 12 with a control grid 14 connected to a source of bias voltage 16. The screen and suppressor grids are connected together and to a source of positive potential, for example, 100 volts. The cathode of the vacuum tube is connected directly to ground (or a source of reference potential) and the plate or anode is connected to the cathode portion of a clamping diode 18 having its anode connected to the same reference potential. The function of the clamping diode will be described hereinafter. Also connected to the anode is a resistor 20 and capacitor 22 parallelly together and in series circuit relationship with a generator 24 for providing a switching (or quenching) anode voltage. In parallel with the resistor 20 and capacitor 22 is a series connected generator 26 for providing an input signal to the circuit with the generator impedance illustrated by a resistor 28.

An equivalent circuit of the embodiment of FIG. 3a is shown in FIG. 3b in which $R_a$ is the effective series resistance 28, $R_1$ and C are the effective loads 20 and 22, respectively, and $R_t$ is the active impedance of the dynatron which can periodically switch between a positive and negative value. If initially a quiescent condition exists in the circuit and at a time 0 an input signal $e_{in}$ is applied by generator 26, then the output voltage $E_c$ appearing across resistor $R_1$ and C can be defined by the following Laplace transformation in which $s$ is an operator.

$$E_c = \frac{e_{in}}{C(R_a)(S+\alpha)} \qquad (2)$$

where $\alpha = \frac{1}{C}\left[\frac{1}{R_a} + \frac{R_1 + R_t}{R_1 R_t}\right]$ For a step function input having a value from 0 to some finite value, then the time dependent relationship becomes $$E_c = \frac{E_{in}(R_1 R_t)(1 - E^{-\alpha t})}{R_a R_t + R_t R_1 + R_1 R_a} \qquad (3)$$

The operation of this first order system can best be understood by the following example. Assume $R_1$ has a value of 10,000 ohms, $R_a$ is 100,000 ohms and C is equal to 0.5 farad. Also assume that the resistance $R_t$ of the dynatron is switching between points $a$ and $b$ as represented in FIG. 1 at a rate of 200 cycles per second, and the input signal from generator 26 has a frequency of 20 cycles per second and a magnitude of 50 millivolts. Then, the output of the system described in FIG. 3a can be illustrated by the wave shapes of FIG. 4a in which the horizontal scale displays time and the vertical scale displays amplitude of the output signal. The low frequency input signal appears at a 20 cycle rate while the higher frequency switching or quenching signal is appearing at a 200 cycle rate. The envelope of this wave shape is that of the input signal with amplification as determined by the selected parameters and as defined by Equation 2.

The above described operation considered only signal amplification within the linear region of dynatron operation. However, in viewing curve C of FIG. 1, there is a region of both linear negative resistance and nonlinear negative resistance which is physically realized as the amplitude of the input signal is increased. FIG. 4b illustrates the linear amplification of an input signal as the dynatron resistance characteristic is switched between points $a$ and $b$ with a square wave potential. The sharp clamping action illustrated in FIG. 4b is provided by the diode 18 which conducts in the forward direction when the switching generator 24 output potential goes to 0.

If the switching rate of the generator 24 is increased such that the capacitor C is not able to discharge completely before the next input signal is applied, there will be a resultant voltage buildup or integration which will saturate the tube and thereby render the system inoperative. Accordingly, the diode 18 prevents this coherency by discharging the capacitor very rapidly through its low impedance current path.

As the switching generator 24 is adjusted so that the time of turn-on is increased, the nonlinear effects of the dynatron become apparent. FIG. 4c illustrates this effect for a negative polarity input signal and FIG. 4d illustrates this same effect for a positive polarity input signal. In addition to the nonlinearities of the dynatron, FIGS. 4c and 4d also illustrate the unsymmetrical negative resistance characteristics thereof.

In general, every behavior which has been traditionally associated with the normal RF superregeneration such as the influence of regenerative time or gain, the linear and nonlinear modes of operation and the random noise pulses in the presence of no input signal (not illustrated herein) and the high gain adjustments were experimentally obtained with the system of FIG. 3a. In addition, the system described with reference to FIG. 3a and analytically defined by a first order differential equation enables amplification of low frequency signals, a feature not previously possible with conventional superregenerative systems. Further, the embodiment of FIG. 3a represents a class of amplifiers exhibiting desirable gain characteristics by periodically quenching an unstable system defined by a first and third through $n$th order differential equation.

Turning now to the system sensitivity, an observation of Equation 2 will reveal that the gain of the system is equal to $E_c/e_{in}$ which is inversely proportional to the capacitance C. Accordingly, by reducing the size of the load capacitor the system voltage gain can be increased. For a capictance value of 0.05 microfarad and a sampling or quenching rate of 400 cycles per second a voltage gain of approximately 30 decibels is achieved for the circuit configuration of FIG. 3a. As the value of capacitance is reduced still further the increasing gain causes considerable noise signals in the output; in particular the frequency of the alternating current voltage applied to the heaters of the dynatron is detected as an input signal and appears at the output. By utilizing hum balancing networks well known to those skilled in the art the hum pickup can be reduced and only random triggering by circuit noise can then be observed. Accordingly, maximum gain commensurate with circuit limitations is achievable with the system described in FIG. 3a.

Although the output of the system described above is not necessarily a replica of the input signal, such as is the normal behavior of standard amplifiers, the output is still linearly sensitive to the magnitude of the driving source, its frequency and its initial phase. This phase sensitivity is unlike standard amplifiers and deserves further consideration. Accordingly, assume that the input voltage $e_{in}$ is of the form $E \cos(\omega t + \theta)$ where $\omega$ is equal to $2\pi$ frequency. Then, if the phase senstivity is defined as an incremental change in output voltage for an incremental change in input phase, the system phase characteristics can be illustrated. FIG. 5a graphically demonstrates this relationship for three different $\alpha/\omega$ ratios. These curves illustrate the relatively linear response output characteristics for various phase sensitivities. It can be readily appreciated that the phase sensitivity of this system is of special interest since it can be used as a phase or frequency modulated detector at low frequencies which are desirable in certain automatic frequency control systems and the like.

Figure 5B:
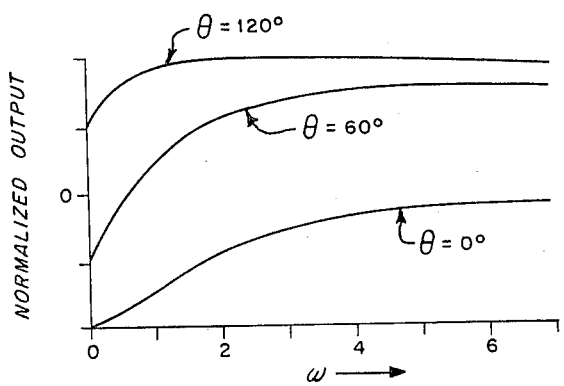

As a result of this phase senstivity characteristics, a peculiar selectivity curve which varies as a function of input phase is obtained. FIG. 5b graphically illustrates this behavior for three phase angles where $\alpha$ is equal to unity. From an observation of FIG. 5b it is readily apparent that the system can have properties of a low pass, high pass or even a frequency null system by just having the cycle of unstable operation begin at different phase angles. It is to be understood that the response curves of FIG. 5b are only one part of the overall frequency sensitivity of the system.

Having thus described the operation of an unstable system which is periodically quenched and defined by the first and third through $n$th order differential equation as a first embodiment, the second embodiment described by all orders of differential equations will now be described. The second embodiment recognizes that special frequency characteristics are obtainable by changing system impedances during the unstable portion of operation. This is accomplished by providing time-varying resistive and reactive elements.

The basic second order system can be defined by the following mathematical equation:

$$e(t) = aq + \frac{bdq}{dt} + \frac{cd^2q}{dt^2} \qquad (4)$$

Unlike the first order system, there is no general formula that will give the solution of this equation for time-varying coefficients, though it is possible to use a series solution. By considering $e(t)$ as an input voltage source, $a$ the series inverse capacitance $(C^{-1})$, $b$ the series resistance $(R)$, and $c$ the series inductance $(L)$, a simple RLC series circuit can be used to physically illustrate the mathematical equation. Incite to the behavior of a second order system defined by this equation can be found in the above-referenced thesis. Accordingly, only a simple system configuration will be illustrated herein.

Referring now to FIG. 6a, a periodically quenched unstable system using time varying impedance elements is illustrated. A vacuum tube 32 similar to that described with reference to FIG. 3a has a bias supply 34 with a negative terminal thereof connected to the control grid of the vacuum tube and the positive terminal thereof connected to a switching generator 36 in series with a resistor 40 connected to a reference potential. The resistor 40 represents the series equivalent resistance of the generator 36. Also connected from the positive terminal of the bias supply 34 to the reference potential is a capacitor 38. Elements 36, 38 and 40 allow the degree of instability of the system to vary during the unstable period of operation as will be described hereinafter.

Connected to the anode of the vacuum tube 32 is an RF signal generator 42 having a source impedance represented by resistor 44. A parallel combination of a resistor 46, a capacitor 48 and an inductor 50 are serially connected with the anode of the vacuum tube and a source of positive potential, $V_p$. The output signal from this circuit is taken across the terminals of the inductor 50.

FIG. 6b illustrates an electrical equivalent circuit of the system of FIG. 6a; however, the mathematical transformations necessary to achieve this electrical equivalent circuit are illustrated in the above-referenced thesis and, accordingly, are not described in detail herein. FIG. 6b does, however, described the parallel RLC arrangement of elements which represent the more advantageous approach to evaluate both analytically and operationally the performance of the system of FIG. 6a. One of the reasons for this resides in the fact that it is nearly impossible to physically realize an inductance without its effective parallel capacitance and series resistance, thereby complicating system analysis in a series RLC system. Accordingly, R represents all the resistance of the system and L is equivalent to the inductor 50 and C is equivalent to the capacitor 48 and any stray shunt capacitance. For this equivalent circuit, the following second order differential equation can be written to express its operation.

$$\frac{d^2e}{dt^2} + \frac{de}{dt}\left[\frac{1}{R_tC}\right] + e\left[\frac{1}{LC}\right] = \frac{L'(t)}{C} \qquad (5)$$

Where $e = E_c$ and $R_t$ is the combined paralleled resistive elements for any finite period, both positive and negative.

The operation of the second order system can be best understood by considering the following example. Assume that resistor 46 equals 10,000 ohms, resistor 44 equals 100,000 ohms, capacitor 48 equals 500 microfarads, and inductor 50 equals 1.0 millihenrys, and if the switching (quenching) oscillator 36 has an output frequency of 250 cycles per second and the input signal generator 42, 30 cycles per second; then, unlike the first order system, the periodic sampling is done by changing the grid bias (with generator 36) and consequently the effective value of the dynatron's dynamic plate resistance. Accordingly, by varying the bias potential, the time-varying impedance is simulated.

By appreciating the fact that the negative resistance of the dynatron increases with increasing grid bias, it can be seen that if the time constant across the quenching square wave oscillator 36 is increased considerably (by increasing the value of capacitor 38) and the fixed bias adjusted so that the resonance frequency gain remains the same, the circuit illustrated in FIG. 6a provides the physical results described previously by the analytical equations. FIG. 7a shows a few cycles of grid voltage for the linear mode of operation and FIG. 7b illustrates the condition for the time-varying case where the capacitor 38 has been increased tenfold. This change in capacity enables the gain selectivity characteristic to be observed, as will be described hereinafter.

FIG. 8a illustrates the output voltage vs. time for two cycles of quenching frequency wherein the input level was adjusted for nonsaturation or a near-linear mode of system operation. An observation of this wave shape illustrates the near exponential rise and decay of the envelope. FIG. 8b is similar to FIG. 8a except the time of regeneration is increased until system saturation occurs. This high frequency signal appearing within the envelopes of FIGS. 8a and 8b is determined by the resonant LC circuit.

Considering now the selectivity vs. gain characteristic as a function of time-varying impedance parameters, selectivity curves for both the linear and time varying regenerative cycles, in which identical resonant gains are maintained, are illustrated in FIG. 9. For the parameters chosen, the effective period of regeneration is approximately the same for the time-varying condition as for the linear condition. FIG. 9 illustrates the increased selectivity for the time-varying regenerative cycle by curve A and the linear prior art regenerative cycle by curve B. The operation then of the periodically quenched amplifier described with reference to FIG. 6a and the accompanying wave shapes, provides for the time varying of impedance elements in an unstable periodically quenched electrical system so that improved frequency, phase and selectivity responses can be obtained.

Figure 11:
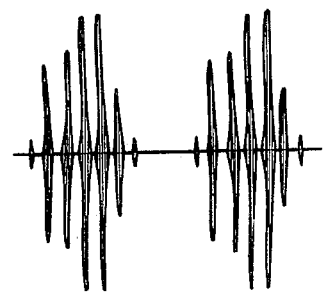
FIG. 11 illustrates typical waveshapes associated with the embodiment of FIG. 10.
Figure 10:
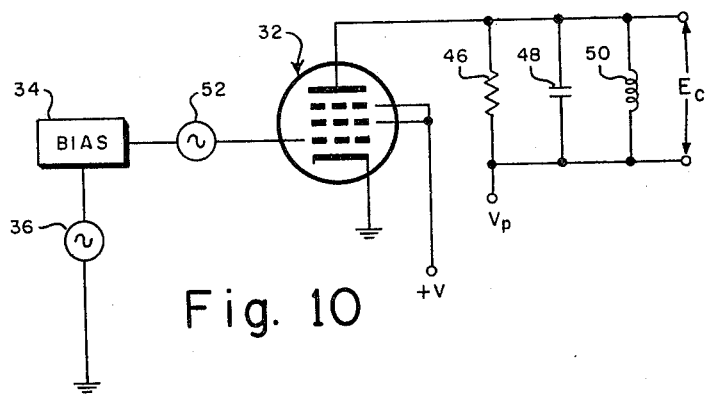
FIG. 10 is a schematic diagram of a third embodiment of the invention.

The third embodiment of the invention, described with reference to FIG. 10, illustrates the use of modulated resistive and reactive elements acting as signal inputs in lieu of the more conventional signal input voltages, the techniques now used for the superregenerative systems in an unstable periodically quenched system. Referring to FIG. 10, there is illustrated an embodiment of the invention similar to the second order system described with reference to FIG. 6a except for the addition of a series connected signal generator 52 in the control grid circuit serving as an input which varies the effective negative resistance of the system during the unstable portion thereof. The generator 42 and effective series resistance 44, as well as capacitor 38, are not used in the embodiment of FIG. 10 since the signal input now appears from signal generator 52. Although the signal generator 52 is illustrated in the grid circuit, the same input signal function could be achieved by placing the generator in series with resistor 46. In either event, any device which provides a variable resistance could be used; for example, a carbon microphone, a resistance varying sensor, or any other resistance varying device could serve as an input signal. Additionally, this mode of operation is not limited to resistance varying elements, but could also utilize capacitance or inductance varying elements as an input signal source. FIG. 11 illustrates a 30 cycle per second input signal to the dynatron's grid as observed at the output of FIG. 10. The resulting modulation of the output signal can be readily observed.

One of the unique advantages of this second order system allows the standard superregenerative system described by a second order differential equation to amplify low frequency signals, a capability nonexsitent in the normal superregenerative circuit. It should be pointed out that, while this feature has been illustrated with respect to the embodiment of FIG. 10, the same principles are also applicable to the first and third through $n$th order systems.

It is to be understood, that although the various embodiments have been illustrated by using a dynatron vacuum tube, other devices exhibiting similar characteristics could likewise be employed.

What is claimed is:

1. An apparatus for amplifying electrical signals, comprising:
   a multielectrode electronic device having a stable and an unstable state;
   an impedance having a first terminal directly connected to an electrode of said device;
   a signal input source having first and second terminals, said first terminal connected to said device only at said electrode for supplying thereto an input signal of a first frequency; and
   means directly connected to a second terminal of said impedance and said second terminal of said signal input source for providing a switching signal of a second frequency, higher than said first frequency, to said electrode, whereby said device is caused to switch between said states.

2. An apparatus for amplifying electrical signal according to claim 1, wherein:
   said device provides to said impedance an amplified output signal which oscillates at said second frequency and has an envelope which is an amplified replica of said first signal.

3. An apparatus as recited in claim 2 further comprising:
   a reactance element connected across said impedance for establishing the gain of said apparatus.

4. An apparatus as recited in claim 3 further comprising:
   means causing said device to exhibit said unstable state with no current flow through said device whereby low level input signals may be amplified.

5. An apparatus as recited in claim 4 further comprising:
   a diode operatively connected to said electrode for providing a low impedance current path across said reactance element.

6. An apparatus as recited in claim 5 wherein said device exhibits positive and negative impedance characteritsics.

7. An apparatus for amplifying electrical signals, comprising:
   a multielectrode electronic device having a stable and an unstable state;
   an impedance network having one terminal directly connected to an electrode of said device;
   a source of voltage potential directly connected to the other terminal of said network for supplying bias to said electrode of said device;
   a signal input source directly connected to said electrode; and
   means connected to said device for varying the dynamic impedance thereof during said unstable state whereby an amplified output signal appears across the terminals of said network.

8. An apparatus as recited in claim 7 wherein said means varying the dynamic impedance of said device comprises:
   a source of bias voltage directly to be connected to a control electrode of said device; and
   a switching generator connected to said source of bias voltage and said control electrode of said device for varying the dynamic impedance of said device, said generator quenching said unstable device.

9. An apparatus as recited in claim 8 further comprising:
   a capacitor connected across said switching generator for changing the time constant thereof whereby greater selectivity can be obtained with the same gain.

10. An apparatus for amplifying electrical signals, comprising:
   a multielectrode electronic device having a stable and an unstable state;
   an impedance network having one terminal directly connected to an electrode of said devcie;
   a source of voltage potential directly connected to the other terminal of said network for supplying bias to said electrode of said device;
   a signal input source directly connected to a control electrode of said device; and
   means connected to said signal input source for varying the dynamic impedance of said device during said unstable state, whereby an amplified output signal appears across the terminals of said network.

11. An apparatus as recited in claim 10 wherein said means varying the dynamic impedance of said device comprises:
   a source of bias voltage directly connected to said signal input source;
   a switching generator connected to said source of bias voltage and said control electrode for varying the dynamic impedance of said device, said generator quenching said unstable device.

References Cited

UNITED STATES PATENTS

| | | | |
|---|---|---|---|
| 2,160,663 | 5/1939 | Jensen | 325—429 |
| 2,605,398 | 7/1952 | Williams | 325—429 |

NATHAN KAUFMAN, Primary Examiner

U.S. Cl. X.R.

330—9